(12) United States Patent
Shevchenko et al.

(10) Patent No.: US 8,266,708 B2
(45) Date of Patent: Sep. 11, 2012

(54) PRIVACY PROTECTION SYSTEM

(75) Inventors: Oleksiy Yu. Shevchenko, Broadlands, VA (US); Alexander V. Pyntikov, Ashburn, VA (US)

(73) Assignee: Broadlands Technologies LLC, Ashburn, VA (US)

( * ) Notice: Subject to any disclaimer, the term of this patent is extended or adjusted under 35 U.S.C. 154(b) by 771 days.

(21) Appl. No.: 12/330,646

(22) Filed: Dec. 9, 2008

(65) Prior Publication Data

US 2010/0146301 A1    Jun. 10, 2010

(51) Int. Cl.
G06F 7/04    (2006.01)
G06F 17/30   (2006.01)
G06F 15/16   (2006.01)

(52) U.S. Cl. .......................................... 726/26; 709/204
(58) Field of Classification Search .......................... None
See application file for complete search history.

(56) References Cited

U.S. PATENT DOCUMENTS

| | | | |
|---|---|---|---|
| 6,986,052 B1 * | 1/2006 | Mittal | 713/190 |
| 2002/0174073 A1 * | 11/2002 | Nordman et al. | 705/64 |
| 2003/0023451 A1 * | 1/2003 | Willner et al. | 705/1 |
| 2003/0051157 A1 * | 3/2003 | Nguyen et al. | 713/201 |
| 2005/0251865 A1 * | 11/2005 | Mont et al. | 726/26 |
| 2007/0118876 A1 * | 5/2007 | Singh et al. | 726/2 |
| 2007/0162474 A1 * | 7/2007 | Parupudi et al. | 707/100 |
| 2008/0168135 A1 * | 7/2008 | Redlich et al. | 709/204 |

OTHER PUBLICATIONS

International Search Report and Written Opinion of the International Searching Authority issued in International Patent Application No. PCT/US2009/067171, mailed Jan. 26, 2010.

* cited by examiner

*Primary Examiner* — William Powers
(74) *Attorney, Agent, or Firm* — McDermott Will & Emery LLP

(57) ABSTRACT

Novel system and methodology for protecting privacy of a computer device's user. A privacy protection device interacts with the computer device to enable the user to operate in multiple private modes. The system involves a data storage coupled to the privacy protection device, via a secure link, such as a Secure Sockets Layer (SSL) tunnel that provides an encryption protocol. The data storage is divided into multiple storage sections corresponding to the multiple private modes. Each section is configured for storing encrypted data supporting a particular private mode. The privacy protection device enables the user to set a selected private mode and runs software applications that use the data from the storage section corresponding to the selected mode.

23 Claims, 2 Drawing Sheets

PRIVACY PROTECTION SYSTEM

FIELD OF THE INVENTION

The present invention relates to computer security, and more particularly, to system and methodology for providing data privacy protection.

BACKGROUND ART

In the past several years, privacy risks of computers' users encountered through Internet use have risen dramatically. The privacy risks can range from the gathering of statistics on users, to malicious acts such as the spreading of spyware and various forms of bug exploitation.

The most common concern in the field of privacy relates to cookies, log files, history files or other personally identifiable information placed on a user's computer during web sessions. Cross-site scripting or other techniques may be used to steal this information from a user's computer. For example, information about person's financial transactions may be compromised. Some browsers offer the option to clear cookies and history automatically whenever the user closes the browser. However, some private information such as log files cannot be deleted. Moreover, private information from the computer may be stolen during an Internet session before cookies and history are cleared.

Another concern relates to web sites visited during a web session. These web sites can collect, store, and possibly share personally identifiable information about users. In addition, users obtain Internet access through an Internet Service Providers (ISPs). All Internet data to and from the user must pass through the ISP. Even if users encrypt the data, the ISP still knows the IP addresses of the sender and of the recipient. Therefore, any ISP has the capability to observe everything about the user's Internet activities. The advent of various search engines and the use of data mining created a capability for data about individuals to be collected and combined from a wide variety of sources very easily.

An anonymizer or an anonymous proxy is a tool that attempts to make activity on the Internet untraceable. It accesses the Internet on the user's behalf, protecting personal information by hiding the source computer's identifying information. However, the anonymizer itself may cause a privacy concern. The anonymizer can read and modify content of the information that the user is sending or receiving. It can intercept and record private information, such as username and password credentials, credit card numbers, that have been transported using the anonymizer. Moreover, even trustworthy anonymizers cannot provide protection for e-mail or chat services. Also, they cannot filter out any malicious code that may reveal the identity of the user who wishes to remain anonymous.

Therefore, there is a need for a comprehensive privacy protection system that would address multiple aspects of data privacy protection while providing sufficient flexibility to enable a computer's user to access required network resources.

SUMMARY OF THE DISCLOSURE

The present disclosure offers novel system and methodology for protecting privacy of a computer device's user. The system includes a privacy protection device interacting with the computer device to enable the user to operate in multiple private modes. The system involves a data storage coupled to the privacy protection device, via a secure link, such as a Secure Sockets Layer (SSL) tunnel that provides an encryption protocol. The data storage includes multiple sections corresponding to the multiple private modes. Each section is configured for storing encrypted data supporting a particular private mode. The privacy protection device enables the user to set a selected private mode, and runs software applications that use the data from the storage section corresponding to the selected mode.

In accordance with one aspect of the disclosure, multiple private modes may enable the user to operate at different levels of privacy. The privacy protection device may provide a unique key for each private mode to encrypt/decrypt data stored in the respective storage section. For example, an integrated-circuit chip may be arranged in the privacy protection device for storing the unique keys.

In accordance with an embodiment of the disclosure, the storage section provided for a particular private mode may include a data area for storing the data supporting the respective private mode, and an application area for storing software applications supporting the respective private mode.

The privacy protection device may remove all data used in the selected mode after terminating operation in that mode. The removed data may be transferred to the storage section corresponding to the selected mode. The transferred data may be encrypted using the respective key.

In accordance with another aspect of the disclosure, the system may include a switching circuit configured in a private mode to prevent data entered by the user from being transferred to an input circuit of the computer device and to forward the entered data to the privacy protection device that may have an input controller for receiving the data transferred from the switching circuit.

In accordance with an embodiment of the disclosure, the computer device may display data using a monitor that provides a private window on a screen for displaying data in the private modes. The private window may differ from a window for displaying data in a non-private mode of operation.

In accordance with a further aspect of the disclosure, a privacy protection device for protecting privacy of data used by a computer device comprises an operating system for running a software application using data loaded from a data storage remote with respect to the privacy protection device and the computer device. The data storage has at least a first storage section for storing first data used in a first private mode of operation available for a user of the computer device, and a second storage section for storing second data used in a second private mode of operation available for the user of the computer device. The first private mode has a privacy level different from a privacy level of the second private mode.

The privacy protection device also includes a boot management circuit responsive to selection of the first private mode for loading the first data into the privacy protection device from the first storage section. The boot management circuit is responsive to selection of the second private mode for removing from the privacy protection device the first data and for loading into the privacy protection device the second data from the second storage section. The first data removed from the privacy protection device may be loaded into the first storage section.

In response to selection of the first private mode, the boot management circuit may also load into the privacy protection device a first software application required in the first private mode, and in response to selection of the second private mode, the boot management circuit may remove the first software application from the privacy protection device and load into the privacy protection device a second software application required in the second private mode. The first software application may be loaded from the first storage section, and the second software application may be loaded from the second storage section.

The privacy protection device may also comprise a key storage for storing a first encryption/decryption key for decrypting the first data loaded in the first private mode, and for encrypting the first data transferred from the privacy protection device to the first storage section; and for storing a second encryption/decryption key different from the first encryption/decryption key, for decrypting the second data loaded in the second private mode, and for encrypting the second data transferred from the privacy protection device to the second storage section. The boot management circuit may be configured to access the first encryption/decryption key in response to first authentication information, and to access the second encryption/decryption key in response to second authentication information different from the first authentication information.

The privacy protection device may enable a user to assess a first network resource during the first privacy mode, and to access a second network resource during the second privacy mode. A filtering circuit may be configured for preventing the user from accessing the first network resource when the user operates in the second privacy mode, and for preventing the user from accessing the second network resource when the user operates in the first privacy mode.

In accordance with a method of the present disclosure, the following steps may be carried out to provide privacy protection:

enabling a user of a computer device to select a first private mode of operation, in response to selection of the first private mode, loading into a privacy protection device first data from a data source remote with respect to the privacy protection device and the computer device, enabling the user to select a second private mode of operation having a privacy level different with respect to a privacy level of the first private mode, and in response to selection of the second private mode, removing from the privacy protection device the first data and loading into the privacy protection device second data from the remote data source.

The method may also involve the steps of:

encrypting the first data transferred from the privacy protection device to the data source when the first private mode is terminated using a first encryption key, and encrypting the second data transferred from the privacy protection device to the data source when the second private mode is terminated using a second encryption key different from the first encryption key.

When the first private mode or the second private mode is selected, data entered by the user may be prevented from being supplied to an input driver of the computer device and instead, the entered data may be forwarded to the privacy protection device.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

Figure 1:
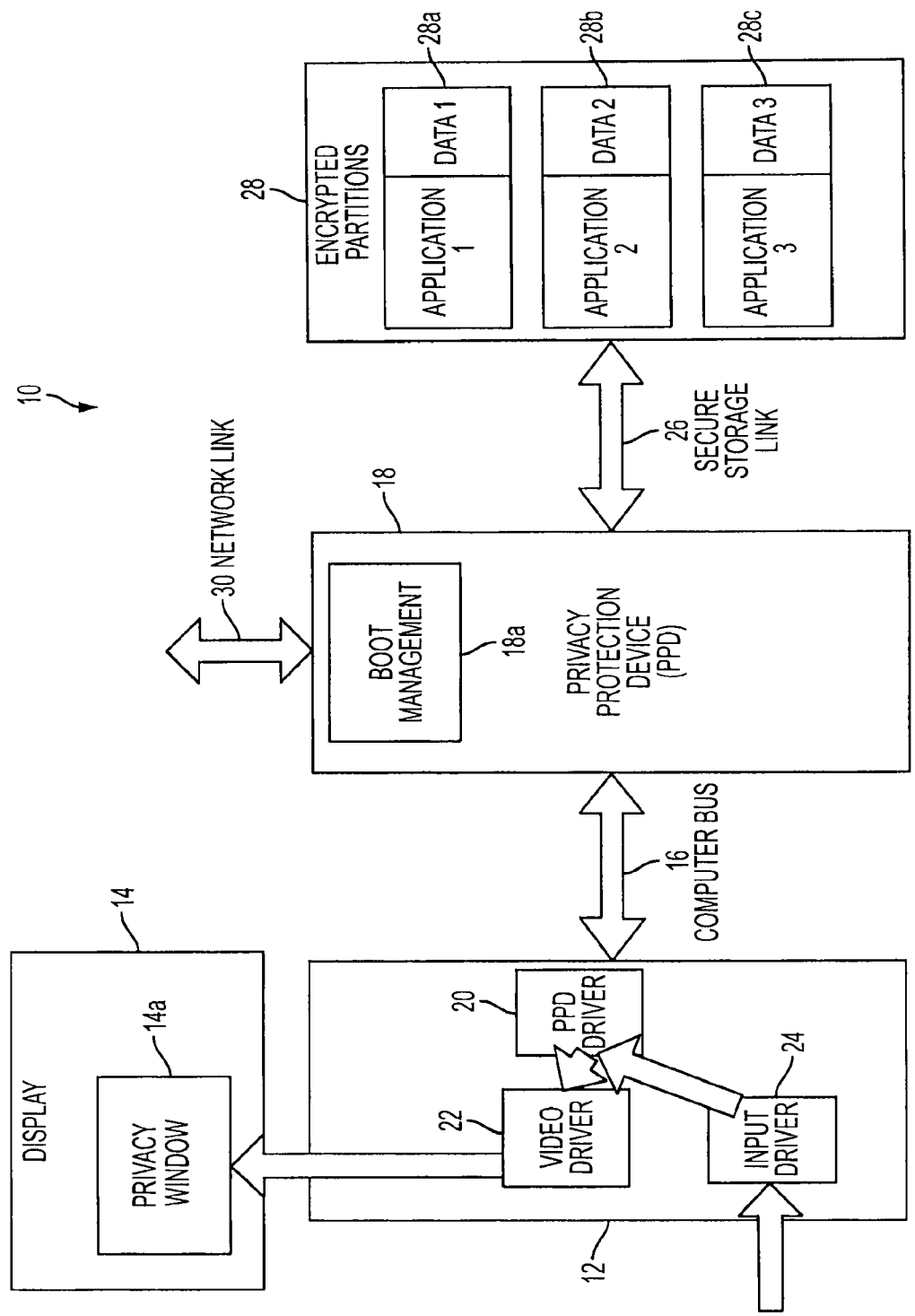
FIG. 1 is a block diagram schematically illustrating an exemplary system for providing privacy protection of the present disclosure.

FIG. 1 illustrates a general concept of an exemplary privacy protection system 10 of the present disclosure that provides privacy protection for a user of a computer device 12 having a display portion 14. Via a computer bus 16, such as a Universal Serial Bus (USB), the computer device 12 may be coupled to a privacy protection device (PPD) 18. Alternatively, the PPD 18 may be a virtual machine arranged in the computer device 12.

The PPD 18 includes hardware and software elements configured for running network-related applications. For example, the PPD 18 may have an operating system able to run various network-related software applications required by the user, such as browser applications, e-mail and chat programs, etc. As discussed in more detail later, to initiate network-related operations in a desired mode, the PPD 18 may load applications and data from a remote storage. The applications and data may be completely removed from the PPD 18 when the desired mode of operations is terminated.

The computer device 12 has a PPD driver 20 for supporting data input from the computer device 12 to the PPD 18, and data output from the PPD 18 to the computer device 12. The PPD 18 may supply the PPD driver 20 with output data in a form of a signal that can be input to a display medium, such as the display 14, capable of presenting information to a user of the computer device 12. Using a video driver 22, the output data may be displayed on the display 14. For example, a privacy window 14a may be arranged on the screen of the display 14 to present the output of the PPD 18. The privacy window 14a may differ from a regular window formed on the display screen in a non-private mode of operation that can be performed by the computer device 12 without the PPD 18.

Further, the computer device 12 may be equipped with an input driver 24 for providing the PPD driver 20 with input information and commands supplied by a user of the computer device 12. The input information and commands may be provided using an input device, such as a keyboard, a pointing device, an electronic mouse, trackball, light pen, thumb wheel, digitizing tablet, touch sensitive pad, etc. An exemplary architecture of the computer device 12 is described in more detail in copending U.S. patent application Ser. No. 11/029,363, filed on Jan. 6, 2005, and incorporated herewith by reference.

Via a secure storage link 26, such as a Secure Sockets Layer (SSL) tunnel, the PPD 18 is connected to a data storage 28 that may be arranged, for example, on a data server remote with respect to the PPD 18. The storage 28 includes multiple encrypted partitions 28a, 28b, 28c. Each of the encrypted partitions stores encrypted applications required for user's network-related operations, and encrypted data used for these operations. The data may be stored in a storage area separated from the area for storing applications. Applications and data in each of the partitions are encrypted by an encryption key unique for a given partition. The encryption key may be generated using the PPD 18.

In accordance with the present disclosure, user's network-related operations are segregated based on a level of required privacy. For example, on-line banking transactions involving operations with bank accounts may require the highest level of privacy. On-line shopping operations using credit cards may require a lower level of privacy. Entertainment-related operations may require even lower level of privacy than shopping.

Each of the encrypted partitions 28 stores encrypted applications and data for supporting network-related operations at a certain level of privacy. For example, the partition 28*a* may store applications and data for supporting operations at the highest level of privacy, e.g., on-line banking operations. Partition 28*b* may store applications and data for supporting operations at a lower level of privacy, e.g. on-line shopping. Partition 28*c* may store applications and data for supporting operations at the lowest level of privacy, e.g. on-line entertainment. As one skilled in the art would realize, any desired number of encrypted partitions may be provided to support the respective number of privacy levels.

Each partition 28 is divided into two areas—one area for storing network-related applications for operations at the respective privacy level, such as a browser, e-mail and chat applications, and the other area for storing data used for operations at the respective privacy level. The applications area and data area are separated from each other.

The PPD 18 contains a boot management circuit 18*a* that determines which level of privacy is selected, and loads to the PPD 18 the encrypted applications from the applications area of a partition 28 with the respective level of privacy. For example, a user of the computer device 12 may be enabled to set operations at a desired level of privacy. The boot management circuit 18*a* may contain a unique encryption/decryption key for each level of privacy defined in the storage 28. Based on the determined level of privacy, the boot management circuit 18*a* uses the respective key to decrypt the applications loaded from the partition 28.

For example, when the PPD 18 is coupled to the computer device 12, the PPD driver 20 may initialize operations of the boost management circuit 18*a* that may issue a request for user to select a level of privacy, i.e. a desired privacy mode of operation. This request may be displayed on the screen of the display 14. In response to the request, a user may enter an identification word that identifies the selected level of privacy. To validate the privacy level selection, the boost management circuit 18*a* may require a user to enter authentication information, such as a password or a security token. Unique authentication information may be required for each level of privacy being selected. Therefore, the user may be authorized to operate at one privacy level but may be prevented from operating at another privacy level. To protect privacy of information entered by the user, the authentication information for a particular level of privacy may be entered as the identification information identifying that privacy level.

In response to the authentication information for a particular privacy level, the boot management circuit 18*a* accesses the encryption/decryption key for that privacy level. This feature provides an additional layer of privacy protection because even if the PPD 18 is lost or stolen, an unauthorized user is prevented from accessing encryption/decryption keys without authentication information for each particular privacy level.

The boot management circuit 18*a* uses the key for a selected privacy level to decrypt the applications loaded from the partition 28. The applications loaded into the PPD 18 may be configured to support any network-related operations performed by the user of the computer device 12 in a mode of operation with the selected level of privacy. The applications may be customized to support operations at a selected privacy level. For example, for on-line banking operations, the applications may include applications for accessing required banks, such as browsing, chat and/or e-mail applications.

For example, the decrypted applications may be loaded into a local memory of the PPD 18 and presented as a data storage, such as a disk, mounted in the PPD 18. It may be visible on the display 14 as a storage icon in the computer device 12. The user may click on the icon to access the loaded applications and initiate any desired application.

In response, to initiating any application, the boot management circuit 18*a* accesses the data area of the respective partition 28, and using the key for the selected privacy level, decrypts the data associated with the selected application. The boot management circuit 18*a* loads these data into a RAM of the PPD 18 to enable the user to ran the loaded application with required data. For example, for on-line banking operations, the data may include user's account information, passwords, cookies required for a browser to facilitate transactions, desired bookmarks, history information, etc.

Via a network link 30, the PPD 18 is coupled to a network, such as an Internet, to enable the user of the computer 12 to perform network-related operations using loaded applications and data supplied from the partition 28. For example, the PPD 18 may be coupled to the Internet via proxy nodes configured to further protect user's identity.

The loaded applications are run only in the PPD 18, not in the computer 12. Therefore, they cannot be corrupted from the user's computer 12 to compromise user's private information even if malware is planted in the computer 12.

Moreover, the data used by the loaded applications are not stored in the PPD 18 or computer 12. They are automatically removed from the RAM of the PPD 18 as soon as power supply is terminated, or the PPD 18 is reset. Therefore, even if the PPD 18 or computer 12 is lost or stolen, the user's private information would not be compromised. Moreover, as discussed in more detail later, the data and applications for a particular private mode are automatically removed from the PPD 18 when the user selects a mode of operation at a different privacy level.

The unique encryption/decryption keys for the partitions 28 may be stored in the PPD 18. Therefore, only the user is able to read user's data and/or modify the loaded applications. Neither an Internet Service Provider nor any intruder is able to read user's data and/or modify the applications. The keys may be stored in a secured manner, for example, in a secured integrated-circuit chip that prevents an unauthorized user from accessing the keys, and may destroy stored information when an unauthorized access is detected.

During network-related operations, the user is able to modify data used by the applications. For example, the user can add or delete bookmarks or links for the mode of operation with the selected privacy level. After a selected mode of operation is terminated, modified data are encrypted by the boot management circuit 18*a* and transferred to the data area of the respective encrypted partition 28. The memories and registers of the PPD 18 are completely cleared to prevent unauthorized access to the user's information. Then, the user may initiate another mode of operation with a different privacy level. In this case, the PPD 18 may be reset and rebooted, and the procedure discussed above is repeated for the partition 28 with the respective privacy level.

During operations at any selected level of privacy, the PPD 18 has access only to a single partition 28 corresponding to that privacy level. Therefore, when a user operates at one privacy level, the data associated with that level cannot result in damaging or stealing the data associated with the other privacy levels. Hence, even if the user receives malware while visiting an entertainment site, this malware cannot be used to steal or damage user's data relating to higher privacy modes, such as banking or shopping.

Further, a user may be enabled to erase from the PPD 18 all data associated with a particular privacy level without transferring the data to the respective partition 28, when the privacy level is changed. As a result, any malware received during operations at a particular privacy level will be automatically removed after terminating these operations.

Moreover, if the user wants to clear all data relating to a certain privacy level, she may generate a new encryption/decryption key for that level to replace the previous key. In this case, the data stored in the partition 28 previously used for operations at that privacy level become completely inaccessible.

Figure 2:
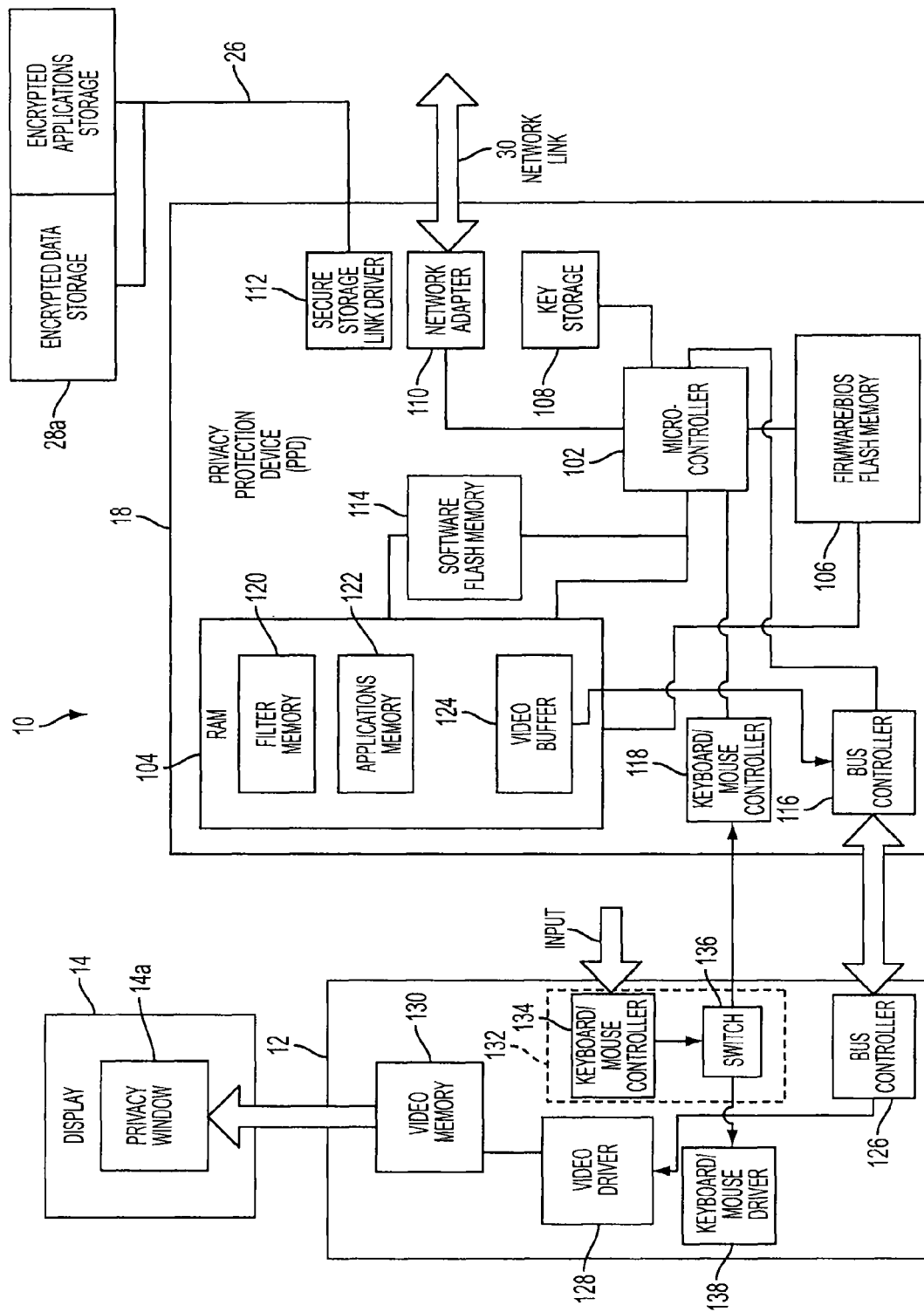
FIG. 2 is a block diagram illustrating the exemplary privacy protection system in more details.

FIG. 2 illustrates an exemplary implementation of the privacy protection system 10. In particular, the PPD 18 may include a microcontroller 102 that controls operations of the PPD 18, a random access memory (RAM) 104, a firmware/basic input-output system (BIOS) flash memory 106 for storing the BIOS and firmware, a key storage 108 for storing encryption/decryption keys for various privacy levels, a network adapter 110 for providing a network interface, and a secure storage link driver 112 for providing an interface with the remote data storage 28. FIG. 2 shows only a single exemplary encrypted partition 28a for a particular privacy protection level. As discussed above, the partition 28a may be divided into an encrypted data storage for storing encrypted data, and an encrypted applications storage for storing software applications run in the PPD 18. Alternatively, the applications run in the PPD 18 may be stored in a software flash memory 114 of the PPD 18. Further, PPD 18 may include a bus controller 116 for providing an interface to the computer device 12 via a computer bus 16, and a keyboard/mouse controller 118 for receiving information entered from an input device of the computer device 12.

The RAM 104 may include a filter memory 120 for storing elements that provide data filtering functions in the PPD 18, an applications memory 122 for temporarily storing applications loaded from the storage 28, and a video buffer 124 that produces a video signal representing output data supplied from the PPD 18. Via the bus controller 116, this video signal is supplied to the computer device 12. Instead of loading applications from the storage 28 every time when the user initiates network-related operations at a selected privacy level, the applications may be stored in the software flash memory 114. The filter memory 120 may support data supply from the storage 28 and data filtering during network-related operations. For example, data filtering may be used during operations at a higher privacy level to prevent the user from accessing network resources that should be accessed at a lower privacy level.

The computer device 12 may include a bus controller 126 that interacts with the bus controller 116 of the PPD 18 to provide a data exchange between the PPD 18 and the computer device 12. The bus controller 126 receives a video signal from the bus controller 116, and supplies this signal to a video driver 128 that drives a video memory 130 to display the video signal on a privacy window 14a on the screen of the display 14. The privacy window 14a may be provided to display information when the user operates in one of privacy protection modes using the PPD 18. When the user performs operations using the computer device 12 without PPD 18, the privacy window 14a is not presented on the screen.

Further, the computer device 12 may include an input controller 132 having a keyboard/mouse controller 134 and a switch 136. The keyboard/mouse controller 134 receives information entered by the user by means of an input device, such as a keyboard or a mouse. This information is transferred to the switch 136 configured so as to prevent this information from being supplied to a respective input driver of the computer device 12 when the privacy window 14a is provided on the screen, i.e. when the user operates in one of the privacy protection modes. Instead, the switch 136 relays this information to the PPD 18 via the keyboard/mouse controller 118. When the privacy window 14a is absent, i.e. when the user operates in a non-private mode using the computer device 12 without PPD 18, the switch 136 relays the input information from the keyboard/mouse controller 134 to a keyboard/mouse driver 138 of the computer device 12 to enable normal operations of the computer device 12.

This input mechanism provides additional protection from such malware as key loggers. In particular, if a key logger is planted on the computer device 12, it can use a keyboard/mouse driver 138 of the computer device 12 to intercept any information that user inputs from the keyboard or mouse. For example, a key logger may intercept the user name and password information entered by the user. However, when the user operates in a privacy protection mode, the switch 136 prevents the keyboard/mouse driver 138 of the computer device from receiving any information entered by the user. Instead, this information is forwarded directly to the PPD 18.

As discussed above, memories and registers of the PPD 18 do not store private information generated during network access sessions. When a session in a privacy protection mode of operation is completed or when a user switches from a mode with one privacy level to a mode with another privacy level, all information is completely removed from the PPD 18. Hence, an intruder is not able to get access to the private information during a network access session at the other privacy level, or even if the PPD 18 is lost or stolen.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such or other embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A system for protecting privacy of a user of a computer device, comprising:

a privacy protection device coupled to the computer device to enable the user of the computer device to operate in multiple private modes, the privacy protection device having a privacy protection controller provided separately from the computer device, for controlling operations of the privacy protection device, a storage coupled to the privacy protection device and including multiple storage sections corresponding to the multiple private modes, each storage section being configured for storing encrypted data supporting a particular mode of the multiple private modes, the storage being accessible by the computer device only via the privacy protection device, the privacy protection device being configured for setting a selected mode of the multiple private modes, and for running a software application that uses the data from the storage section corresponding to the selected mode, to enable the user to operate in the selected mode.

2. The system of claim 1, wherein the privacy protection device is configured for providing a unique key for each private mode to encrypt and decrypt data stored in the respective storage section.

3. The system of claim 2, wherein the privacy protection device includes a circuit for storing the unique key for encrypting and decrypting data stored in each of the storage sections.

4. The system of claim 1, wherein the multiple private modes enable the user to operate at different levels of privacy.

5. The system of claim 1, wherein a storage section provided for a particular private mode includes a data area for storing the data supporting the respective private mode, and an application area for storing a software application supporting the respective private mode.

6. The system of claim 1, wherein the privacy protection device is configured for clearing all data used in the selected mode after terminating operation in the selected mode.

7. The system of claim 1, wherein the privacy protection device is configured for transferring data associated with the selected mode to the storage corresponding to the selected mode after terminating the selected mode.

8. The system of claim 7, wherein the privacy protection device is configured for encrypting the data being transferred to the storage section.

9. The system of claim 8, wherein the storage is coupled to the privacy protection device via a secure link that provides an encryption protocol.

10. The system of claim 1, further comprising a switching circuit configured in a private mode to prevent data entered by the user from being transferred to an input circuit of the computer device and to forward the entered data to the privacy protection device.

11. The system of claim 10, wherein the protection device includes an input controller for receiving the data transferred from the switching circuit.

12. The system of claim 1, wherein the computer device is configured to display data using a monitor that provides a private window on a screen for displaying data in the private modes, the private window being different from a window for displaying data in a non-private mode of operation.

13. A privacy protection device coupled to a computer device for protecting privacy of data used by the computer device, the privacy protection device comprising:

a controller provided separately from the computer device, for controlling operations of the privacy protection device, an operating system for running a software application using data loaded from a data storage remote with respect to the privacy protection device and the computer device, the data storage having at least a first storage section for storing first data used in a first private mode of operation available for a user of the computer device, and a second storage section for storing second data used in a second private mode of operation available for the user of the computer device, the first private mode has a privacy level different from a privacy level of the second private mode, the data storage being accessible by the computer device only via the privacy protection device; and a boot management circuit responsive to selection of the first private mode for loading the first data into the privacy protection device from the first storage section, the boot management circuit being responsive to selection of the second private mode for removing from the privacy protection device the first data and for loading into the privacy protection device the second data from the second storage section.

14. The device of claim 13, wherein the first data removed from the privacy protection device is loaded into the first storage section.

15. The device of claim 13, wherein the boot management circuit is responsive to selection of the first private mode for loading into the privacy protection device a first software application required in the first private mode, and responsive to selection of the second private mode for removing the first software application from the privacy protection device and loading into the privacy protection device a second software application required in the second private mode.

16. The device of claim 15, wherein the first software application is loaded from the first storage section, and the second software application is loaded from the second storage section.

17. The device of claim 13, further comprising a key storage for storing a first encryption/decryption key for decrypting the first data loaded in the first private mode, and for encrypting the first data transferred from the privacy protection device to the first storage section; and for storing a second encryption/decryption key different from the first encryption/decryption key, for decrypting the second data loaded in the second private mode, and for encrypting the second data transferred from the privacy protection device to the second storage section.

18. The device of claim 17, wherein the boot management circuit is configured to access the first encryption/decryption key in response to first authentication information, and the boot management circuit is configured to access the second encryption/decryption key in response to second authentication information different from the first authentication information.

19. The device of claim 13, wherein the privacy protection device enables a user to assess a first network resource during the first privacy mode, and to access a second network resource during the second privacy mode.

20. The device of claim 19, further comprising a filtering circuit configured for preventing the user from accessing the first network resource when the user operates in the second privacy mode, and for preventing the user from accessing the second network resource when the user operates in the first privacy mode.

21. A method of privacy protection comprising the steps of:

enabling a user of a computer device to select a first private mode of operation, in response to selection of the first private mode, loading into a privacy protection device first data from a data source remote with respect to the privacy protection device and the computer device, the privacy protection device having a controller provided separately from the computer device, for controlling operations of the privacy protection device, the data source being accessible by the computer device only via the privacy protection device, enabling the user to select a second private mode of operation having a privacy level different with respect to a privacy level of the first private mode, and in response to selection of the second private mode, removing from the privacy protection device the first data and loading into the privacy protection device second data from the remote data source.

22. The method of claim 21, further comprising the steps of:

encrypting the first data transferred from the privacy protection device to the data source when the first private mode is terminated using a first encryption key, and encrypting the second data transferred from the privacy protection device to the data source when the second private mode is terminated using a second encryption key different from the first encryption key.

23. The method of claim 21, further comprising the step of, when the first private mode or the second private mode is selected, preventing data entered by the user from being supplied to an input driver of the computer device and forwarding the entered data to the privacy protection device.

* * * * *